(12) United States Patent
Roussos et al.

(10) Patent No.: US 8,341,119 B1
(45) Date of Patent: Dec. 25, 2012

(54) FLEXIBLE COPIES HAVING DIFFERENT SUB-TYPES

(75) Inventors: Konstantinos Roussos, Sunnyvale, CA (US); Rushi Srinivas Surla, Bangalore (IN); Vasantha Prabhu, Kamataka (IN); Gaurab Paul, Kamataka (IN); Ritesh Tiwari, Kamataka (IN); Boris Teterin, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 377 days.

(21) Appl. No.: 12/558,642

(22) Filed: Sep. 14, 2009

(51) Int. Cl.
*G06F 7/00* (2006.01)
*G06F 17/00* (2006.01)

(52) U.S. Cl. ......... 707/639; 707/812; 711/114; 711/154

(58) Field of Classification Search .................. 707/638, 707/639, 649, 657, 812, 663, 690; 711/100, 711/162, 114, 145, 147, 152, 158, 159, E12.001, 711/154; 714/6, E11.084
See application file for complete search history.

(56) References Cited

U.S. PATENT DOCUMENTS

| | | | | |
|---|---|---|---|---|
| 5,367,632 | A * | 11/1994 | Bowen et al. ................. | 345/531 |
| 6,360,189 | B1 * | 3/2002 | Hinds et al. ........................ | 703/2 |
| 7,334,095 | B1 * | 2/2008 | Fair et al. ...................... | 711/161 |
| 7,409,497 | B1 * | 8/2008 | Kazar et al. ...................... | 711/114 |
| 7,409,511 | B2 * | 8/2008 | Edwards et al. ............... | 711/161 |
| 7,552,146 | B1 * | 6/2009 | Kahn et al. ............. | 707/999.202 |
| 7,587,563 | B1 * | 9/2009 | Teterin et al. .................. | 711/162 |
| 7,600,083 | B2 * | 10/2009 | Aggarwal et al. ............. | 711/154 |
| 7,899,795 | B1 * | 3/2011 | Kahn et al. .................... | 707/690 |
| 7,933,936 | B2 * | 4/2011 | Aggarwal et al. ............. | 707/812 |
| 7,974,953 | B1 | 7/2011 | Surla et al. | |
| 8,166,257 | B1 * | 4/2012 | Holl et al. ...................... | 711/154 |
| 2005/0246401 | A1 * | 11/2005 | Edwards et al. ............... | 707/205 |
| 2006/0179170 | A1 * | 8/2006 | Kodama ............................ | 710/8 |
| 2007/0016740 | A1 * | 1/2007 | Somavarapu .................. | 711/162 |
| 2007/0094465 | A1 * | 4/2007 | Sharma et al. ................. | 711/162 |
| 2007/0124341 | A1 * | 5/2007 | Lango et al. ................... | 707/202 |
| 2007/0233868 | A1 * | 10/2007 | Tyrrell et al. .................. | 709/226 |
| 2008/0072000 | A1 * | 3/2008 | Osaki et al. .................... | 711/162 |
| 2008/0275925 | A1 * | 11/2008 | Kimmel ................. | 707/E17.007 |
| 2009/0276833 | A1 * | 11/2009 | Paul et al. .......................... | 726/4 |

OTHER PUBLICATIONS

Bassett et al.—"Perspectives on Model Based Integration of Process Operations"—Computers & Chemical Engineering—vol. 20, No. 6/7—Jun.-Jul. 1996, (pp. 821-844).*
Moutaz Khouja—"The scheduling of economic lot sizes on volume flexible production systems"—International Journal of Production Economics—vol. 48, Issue 1, Jan. 10, 1997, (pp. 73-86).*

(Continued)

*Primary Examiner* — Anh Ly
(74) *Attorney, Agent, or Firm* — Cooper Legal Group, LLC

(57) ABSTRACT

According to one or more of the provisions set forth herein, data can be managed in a data storage system in an efficient manner. In one example, a first flexible copy volume of data is generated based on a snapshot copy volume of a flexible volume containing the data. The first flexible copy volume is configured to be operated upon according to a first set of operations. A second flexible copy of the data is also generated based on the snapshot copy volume. The second flexible copy volume is configured to be operated upon according to a second set of operations that differs from the first set of operations. Having a second copy of the data allows testing or other operations to be performed on the data while also maintaining an original version of the data.

25 Claims, 11 Drawing Sheets

OTHER PUBLICATIONS

Osuna, Alex, "An Introduction to FlexClone Volumes", IBM Corp. 2006, http://www.redbooks.ibm.com/redpapers/pdfs/redp4133.pdf.

Edwards, et al., "FlexVol: Flexible, Efficient File Volume Virtualization in WAFL", Appears in Proceedings of the 2008 USENIX Annual Technical Conference. Boston, MA. Jun. 2008, http://www.usenix.org/event/usenix08/tech/full_papers/edwards_html/index.html.

"Volume (computing)", pp. 1-4, http://en.wikipedia.org/wiki/Volume_(computing).

* cited by examiner

FLEXIBLE COPIES HAVING DIFFERENT SUB-TYPES

BACKGROUND

In our modern communications age, commercial enterprises, consumers, and other entities are storing an ever increasing amount of digitized data. For example, many entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

In some modern data storage systems, data is formatted or organized as a file so that it can be stored within file systems and/or volumes. Since the data is digital or "digitized" (e.g., stored as bits of either 0 or 1), one or more (backup) copies of the data can be made relatively easily. When a copy of a data file is made, the original file is at times referred to as the parent while the copy may be referred to as the child, where the child is a lossless (e.g., bit for bit) snapshot or "picture" of the parent data taken at a particular point in time. Similarly, in such a scenario, the original file may be regarded as residing on or being stored within a parent volume while the copy may be regarded as residing on or being stored within a child volume, where a volume generally corresponds to an amount of memory allocated for storing the data file.

It can be appreciated that in some situations it may be advantageous and/or otherwise desirable to maintain a copy of the data as it appeared at some point in time (e.g., as depicted in the parent volume), while also being able to perform testing and/or other operations upon the data as it appeared at that same point in time (e.g., as depicted in a child volume), where such testing or other operations may occur at the same and/or one or more later points in time.

In order to provide for this functionality, data storage systems have evolved to include flexible copy volumes, which effectively store children files of a parent file. That is, a child or snapshot copy of a parent data file can be stored on a flexible copy volume such that the child file can be manipulated and/or otherwise modified (e.g., for data verification, product/system development, testing, bug fixing, upgrade checks, data set simulations, etc.) without affecting the parent data file.

It can be appreciated that establishing different flexible copy volumes such that they, or rather the (child) data stored therein, can be operated on by merely the same or a single set of operations can constrain the usefulness and/or robustness of such flexible copy volumes. For example, with such a limited set of operations available for application to flexible copy volumes, a user may be prone to keep multiple snapshots of the data (possibly taken at different points in time) in an attempt to observe one or more trends, for example, as one or more of the predefined operations are repeatedly applied to the data. It will be appreciated, however, that this is just one of any number of examples where the inflexibility afforded by having the same set of operations available to apply to different flexible copy volumes may cause and/or otherwise encourage a user to maintain a large number of flexible copy volumes (e.g., not deleting them in a timely manner). However, since respective flexible copy volumes require some resources (e.g., physical memory), maintaining a large number of flexible copy volumes can (undesirably) consume a large amount of resources.

SUMMARY

According to one or more techniques and/or systems provided herein flexible copy volumes, or rather the (child) data stored therein, can be operated upon by different respective sets of operations, which can conserve resources by encouraging users to delete flexible copy volumes more quickly and/or otherwise maintain fewer flexible copy volumes. For example, allowing different sets of operations to be applied to different flexible copy volumes may improve the robustness of the volumes, for example, by allowing trends and/or other issues related to the data stored therein, for example, to be discerned more quickly. For example, where different sets of operations can be applied to child data stored in different flexible copy volumes, merely five (5) iterations may be required, for example, to discern some trend and/or other issue related to the data (e.g., five (5) different sets of operations applied to five different flexibly copy volumes), whereas if merely the same set of operations could be applied to the data stored in different flexible copy volumes, fifty (50) iterations may be required, for example, to unearth the same trend and/or issue (e.g., fifty (50) applications of the same set of operations to fifty different flexibly copy volumes—where the different snapshots of data stored therein may have been acquired at different points in time). Regardless of the example or application, it can be appreciated that since respective flexible copy volumes require some resources (e.g., physical memory), reducing the number of flexible copy volumes can significantly reduce the resources used. For example, allowing different flexible copy volumes to be operated on with different respective sets of operations may encourage a user to delete flexible copy volumes more frequently and/or otherwise maintain or make use of fewer flexible copy volumes.

Accordingly, as provided herein, a first flexible copy volume (e.g., a restricted flexible copy volume) can be setup so as to be operated on by a first set of operations; and a second flexible copy volume (e.g., an unrestricted flexible copy volume) can be setup so as to be operated on by a second set of operations that is different from the first set of operations. That is, different flexible copy volumes, or rather the (child) data stored therein, can be operated upon by different respective sets of operations. In one or more embodiments, since it is not uncommon for a user to access a flexible copy volume just one or few times shortly after the volume is created, host based software can be configured to automatically delete particular flexible copy volumes (e.g., those that can be operated on by a second set of operations) shortly after they are created, thereby reducing the total number of flexible copy volumes maintained, and thus the amount of memory and/or other resources utilized (particularly where a user fails to manually delete the volume(s)). It will be appreciated that since flexible copy volumes maintain snapshot or child data therein, when a flexible copy volume is said to be acted upon in some manner herein (e.g., operated on by/according to a set of operations, etc.) this is intended to indicate that the data maintained by the flexible copy volume (e.g., child data) is so acted upon, even though such statement may not be so explicitly expressed.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
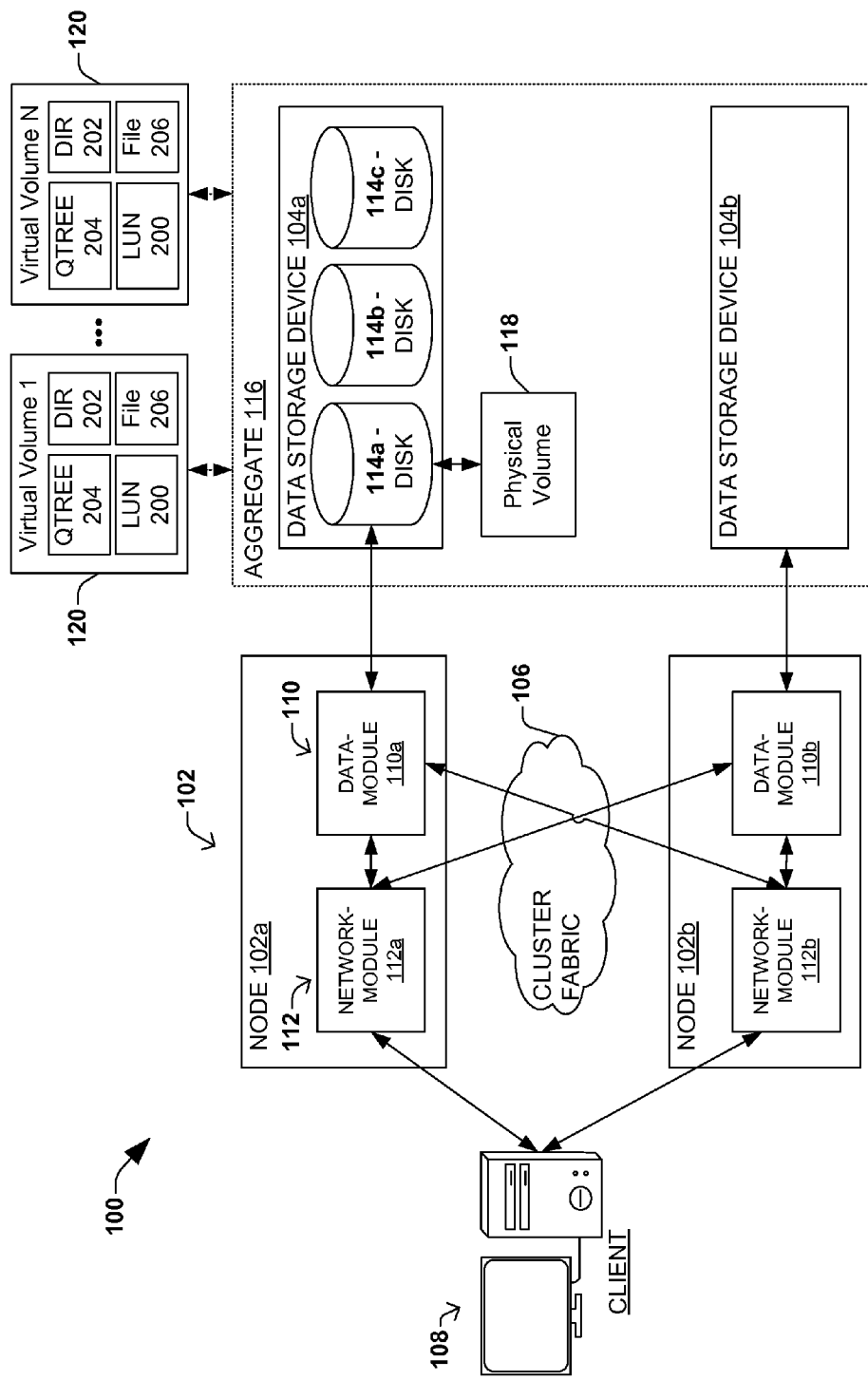
FIG. 1 is an illustration of an embodiment of an example data storage system.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

To provide improved user functionality and promote efficient resource utilization, the present disclosure provides for flexible copy volumes that can be operated upon by different respective sets of operations. To provide a context for one example of how a flexible copy volume may be implemented, FIG. 1 illustrates a data storage system 100 and FIGS. 2-8 illustrate how a flexible copy volume can be employed to store and manage data in this data storage system. It will be appreciated that where the same or similar components, elements, features, items, modules, etc. are illustrated in later Figs. but were previously discussed with regard to prior Figs., that a similar (e.g., redundant) discussion of the same may be omitted when describing the subsequent Figs. for purposes of simplicity and ease of understanding.

Turning now to FIG. 1, an example of a data storage system 100 is illustrated. The data storage system 100 includes a plurality of nodes 102 (e.g., first and second nodes 102a, 102b) that are operatively coupled to respective data storage devices 104 (e.g., first and second data storage devices 104a, 104b) as well as a cluster fabric 106, such as a computing network embodied as an Ethernet or Fibre Channel (FC) network facilitating which facilitates communication between the nodes 102a, 102b and/or modules or components therein. These components are operably coupled to provide one or more clients 108 with access to data stored in the data storage system 100, for example, in a clustered data storage and management network environment that may implement one or more embodiments of the techniques and/or systems described herein.

It should be appreciated that, while the embodiment 100 depicts only first and second nodes 102a, 102b; data storage systems often include many more nodes, where respective nodes can be coupled to one or more respective data storage devices 104 as well as to the other nodes. Nevertheless, it is also to be appreciated that a data storage system, as the phrase is used herein, may also comprise a single node (e.g., only 102a) rather than a plurality of nodes 102a, 102b, etc. Similarly, it will be appreciated that a different number of any of the different components, modules, elements, features, items, etc. illustrated in FIG. 1 is contemplated. That is, the system 100 illustrated in FIG. 1 and the number of items, components, modules, elements, features, etc. illustrated therein (as well as in other Figs.) are not intended to be interpreted in a limiting manner.

As illustrated, respective nodes 102 can comprise one or more data module(s) 110 and one or more network module(s) 112. A data module 110 within a given node 102 enables that node to connect to one or more respective data storage devices 104 coupled to the node. For example, in the illustrated embodiment, a first data module 110a couples the first node 102a to a first data storage device 104a, where the first data storage device 104a includes a disk array made up of a number of disks 114 (e.g., first 114a, second 114b and third 114c disks in the illustrated example). Similarly, a second data module 110b couples the second node 102b to a second data storage device 104b, where the second data storage device 104b can include a disk array or some other type of memory device, such as one or more flash storage device(s), for example (not illustrated).

Often, data modules 110 communicate with the data storage devices 104 according to a storage area network (SAN) protocol, such as Small Computer System Interface (SCSI) or Fibre Channel Protocol (FCP), for example. Thus, as seen from an operating system (not shown) on a node 102, the data storage devices 104 appear as locally attached to the operating system. In this manner, different nodes 102a, 102b, etc. typically access data blocks through the operating system.

In addition to the data modules 110, the nodes 102 also include network modules 112 for connecting with one or more other components through the cluster fabric 106. For example, in FIG. 1, first network module 112a of first node 102a can access second data storage device 104b by sending a request through second data module 110b of second node 102b.

The network modules 112 also allow the respective nodes 102 to carry out communication with one or more clients 108. For example, the client 108 may request the services of the data storage system 100 through first node 102a (e.g., acting as a host/server having an IP address), after which the first node 102a may return the results of the requested services to the client 108. The network modules 112 and client 108 can exchange packets, for example, using Network Attached Storage (NAS) protocols, such as a Common Internet File System (CIFS) protocol or a Network File System (NFS) protocol, for example. By way of example, a client may request a file by providing a file identifier (e.g., inode number and generation number) along with a volume identifier (e.g., file system identifier (FSID)), which uniquely identifies a file as belonging to a particular volume.

Although respective nodes 102 are illustrated as single units in FIG. 1, it will be appreciated that one or more of such nodes can have a distributed architecture. For example, the node 102a can be implemented with multiple distributed storage servers. In addition, the network module (e.g., 112a) and data module (e.g., 110a) within a node 102 can be contained in separate housings and communicate with each other via network connections. In one embodiment, the network modules 112 can comprise respective servers and the data modules 110 can comprise respective filer devices as may be provided by the assignee of the instant application, for example. However, other devices and/or components can also be used depending on the implementation. An additional discussion of a node 102 is had below with regard to FIG. 11.

An operating system (not illustrated) installed on the nodes 102 manages communications between the nodes 102, thereby allowing the nodes 102 to respond to client requests to manage data on the data storage devices 104 in accordance with these client requests. The operating system also facilitates integrating new files and/or storage devices into the system. As can be appreciated, data can be stored in the system 100 as files within physical 118 and/or virtual 120 volumes, which can be associated with respective volume identifiers, such as file system identifiers (FSIDs), which can be 32-bits in length in one example.

A physical volume 118, which may also be referred to as a "traditional volume" in some contexts, corresponds to at least a portion of physical memory whose address doesn't change, such as at least some of a data storage device (e.g., a Redundant Array of Independent (or Inexpensive) Disks (RAID system)). For example, physical volume 118 is illustrated in FIG. 1 as comprising at least some of the first disparate disk 114a of data storage device 104a, where the location of this physical volume 118 generally does not change in that the address used to access it generally remains constant and corresponds to one physical device.

A virtual volume 120, in contrast, is stored over an aggregate 116 of disparate portions of one or more different physical storage devices. The virtual volume can thus be thought of as a collage or patchwork of different available portions of different physical memory locations, such as some available space on first disk 114a, some available space on second disk 114b and/or some available space on third disk 114c. It can be appreciated that since a virtual volume is not "tied" to any one particular storage device (e.g., 114a, 114b, 114c), a virtual volume can be said to include a layer of abstraction or virtualization, which allows it to be resized and/or flexible in some regards.

A virtual volume 120 can include one or more logical unit numbers (LUNs) 200, directories 202, qtrees 204, and files 206. Among other things, these features allow the disparate memory locations within which data is stored to be identified. As such, one or more of these features, particularly the LUNs 200, can be thought of as constituting a virtual disk upon which the data within the virtual volume 120 is stored within the aggregate 116. As will be appreciated, one or more virtual volumes can comprise one or more flexible copy volumes such that different respective sets of operations can be performed on different flexible copy volumes.

Figure 2:
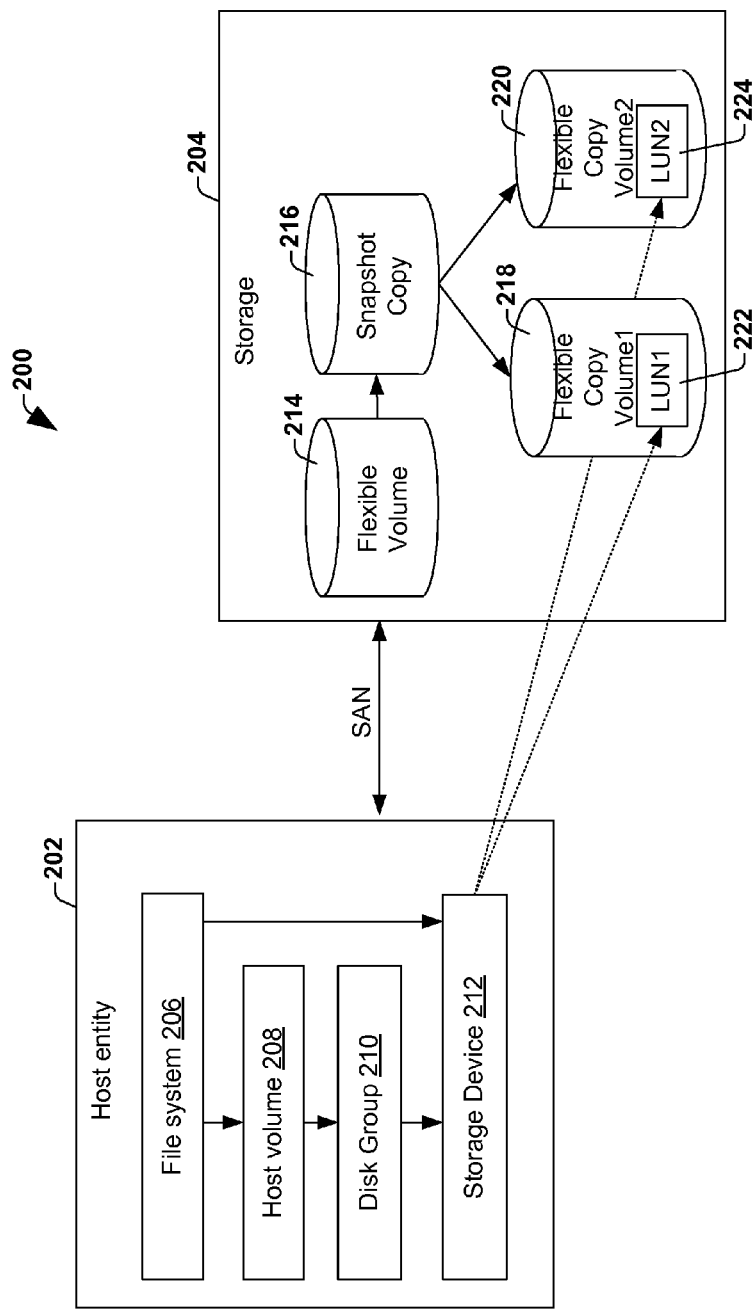
FIG. 2 illustrates an arrangement wherein one or more flexible copy volumes can be maintained and acted upon by different respective sets of operations.

FIG. 2 illustrates an arrangement 200 wherein one or more flexible copy volumes can be maintained, where the different flexible copy volumes can be acted upon by different respective sets of operations. Since some aspects of FIG. 2 resemble aspects of FIG. 1, FIG. 2 can, in a sense, be thought of as an abridged version of FIG. 1, where FIG. 2 lends itself to a more focused discussion of the handling of flexible copy volumes as provided herein.

The arrangement 200 comprises a host entity component 202 and a storage component 204. In the illustrated example, the host entity component 202 comprises a file system 206, a host volume 208, a disk group 210 and a storage device 212. The storage component 204 comprises a flexible volume 214, a snapshot copy volume 216, a first flexible copy volume 218 and a second flexible copy volume 220, where the first flexible copy volume 218 has a corresponding first LUN 222 and the second flexible copy volume 220 has a corresponding second LUN 224. As will be appreciated, the first flexible copy volume 218 may be a restricted copy that can be acted upon by a first set of operations, and the second flexible copy volume 220 may be an unrestricted copy that can be acted upon by a second (different) set of operations.

The host entity component 202 and the storage component 204 can communicate with one another via a storage area network (SAN) protocol, such as Small Computer System Interface (SCSI) or Fibre Channel Protocol (FCP), for example, where the host entity component 202 may be identified by an Internet-Protocol (IP) address, for example. It will be appreciated that the host entity component 202 may be running on one or more nodes in a clustered computing environment, such as nodes 102a and/or 102b of the system 100 illustrated in FIG. 1, for example.

Accordingly, computer instructions, that may be in the form of provisioning, management software and/or an operating system, for example, that are executable on one or more nodes (e.g., at the initiation of a user and/or automatically) may cause the flexible volume 214 to be created, where the flexible volume 214 may comprise a copy of one or more of the items in the host entity component 202. The snapshot copy volume 216 and the first 218 and second 220 flexible copy volumes may be created in a similar manner, where the snapshot copy volume 216 comprises a copy of the flexible volume 214, and the first 218 and second 220 flexible copy volumes comprise respective copies of the snapshot copy volume 216. It will be appreciated that the flexible volume 214, the snapshot copy volume 216 and the first 218 and second 220 flexible copy volumes may be stored within one or more virtual volumes, such as one or more of the virtual volumes 120 illustrated in FIG. 1, for example. Accordingly, the storage component 204 may be comprised of an aggregate of disparate portions of one or more different physical storage devices, such as the aggregate 116 illustrated in FIG. 1, for example.

Thus, in one example, one or more users can, via one or more nodes, cause one or more backup copies of the data on the host entity 202 to be created by having the data be stored as a flexible volume 214 and then creating one or more snapshot copy volumes 216 and one or more flexible copy volumes 218, 220, where one or more of the flexible copy volumes can be designated as restricted so as to be acted upon by a first set of operations or unrestricted so as to be operated upon by a second set of operations, for example. Such designations may be established (e.g., through provisioning, management software and/or an operating system) when the flexible copy volumes are created, for example, and the designations may be comprised within metadata of the respective flexible copy volumes, for example. Accordingly, in contrast to conventional situations where the metadata regarding the respective sets of operations that can be performed upon different flexible copy volumes (or rather the data stored therein) may be virtually identical across the different flexible copy volumes, this metadata can now be different across (at least some of) the different flexible copy volumes to indicate that one or more of the flexible copy volumes can be operated on by a first set of operations while one or more other flexibly copy volumes can be operated on by a second, different, set of operations.

It will be appreciated that since the flexible copy volumes 218, 220 have respective logical unit numbers (LUNs) 222, 224, the flexible copy volumes can themselves be individually accessed to create yet another copy of the data therein. Creating another backup of host entity data by making a copy of a flexible copy volume is at times referred to as cloning, or cloning the host entity. Similarly, the items and/or data within the host entity 202 can at times be referred to as the host side storage stack. For example, in the example illustrated, the host side storage stack can be said to comprise a file system 206 on a host volume 208 on a disk group 210; or a file system 206 on a raw device 212. Thus cloning a host entity can be accomplished by connecting to a LUN of a flexible copy volume and then building a copy of the host side storage stack within another flexible copy volume (e.g., the accessed flexible copy volume may be regarded as the parent and the new flexible copy volume may be regarded as the child). It will be appreciated that the file system 206, host volume 208, and disk group 210 are generally "frozen" or stopped (e.g., by provisioning and/or management software) before a snapshot is taken to yield a status or picture of these items at a particular point in time.

It can be appreciated that it takes little to no time to create a flexible copy volume and thus they may be created frequently and/or routinely by a user. For example, in some scenarios a user may create a flexible copy volume to verify the data in a snapshot copy and then delete (or not) the flexible copy volume after the verification task is complete. In this scenario, it may be desirable to allow a user to create a restricted flexible copy volume that prevents other users from doing provisioning and/or other operations (e.g., snapshot operations) on the restricted flexible copy volume. In other scenarios, it may be desirable to allow a user to create an unrestricted flexible copy volume for prototyping and/or other system operations. Such an unrestricted flexible copy volume could be used for provisioning and/or other operations as with one or more other types of volumes, for example.

Additionally, in an effort to conserve resources one or more mechanisms and/or techniques can be implemented, such as through management software and/or an operating system, for example, whereby flexible copy volumes can be deleted manually and/or automatically once they are no longer needed. By way of example, where a flexible copy volume is designated as a restricted flexible copy volume and is used to verify data in a snapshot copy volume, that flexible copy volume can be deleted once the verification is complete. For example, an application, an operating system and/or some other type of control mechanism may examine the metadata of the flexible copy volume and identify that it is of a particular type (e.g., restricted). Thus, once the task allocated to the flexible copy volume is complete (e.g., verification), whatever control mechanism is in place can determine that the flexible copy volume will not be used again, and thus can facilitate deletion of the same. This inhibits storage of unnecessary flexible copy volumes and thus encourages efficient resource utilization. It will be appreciated that establishing a flexible copy volume for such a fixed/limited purpose may also encourage a user to manually delete such flexible copy volumes in a timely manner. Also, consulting metadata in this manner, such as to determine what type of operations may be performed on the data, may be applicable regardless of where an operation request is initiated (e.g., from any of multiple hosts sharing a single flexible copy volume).

Figure 3:
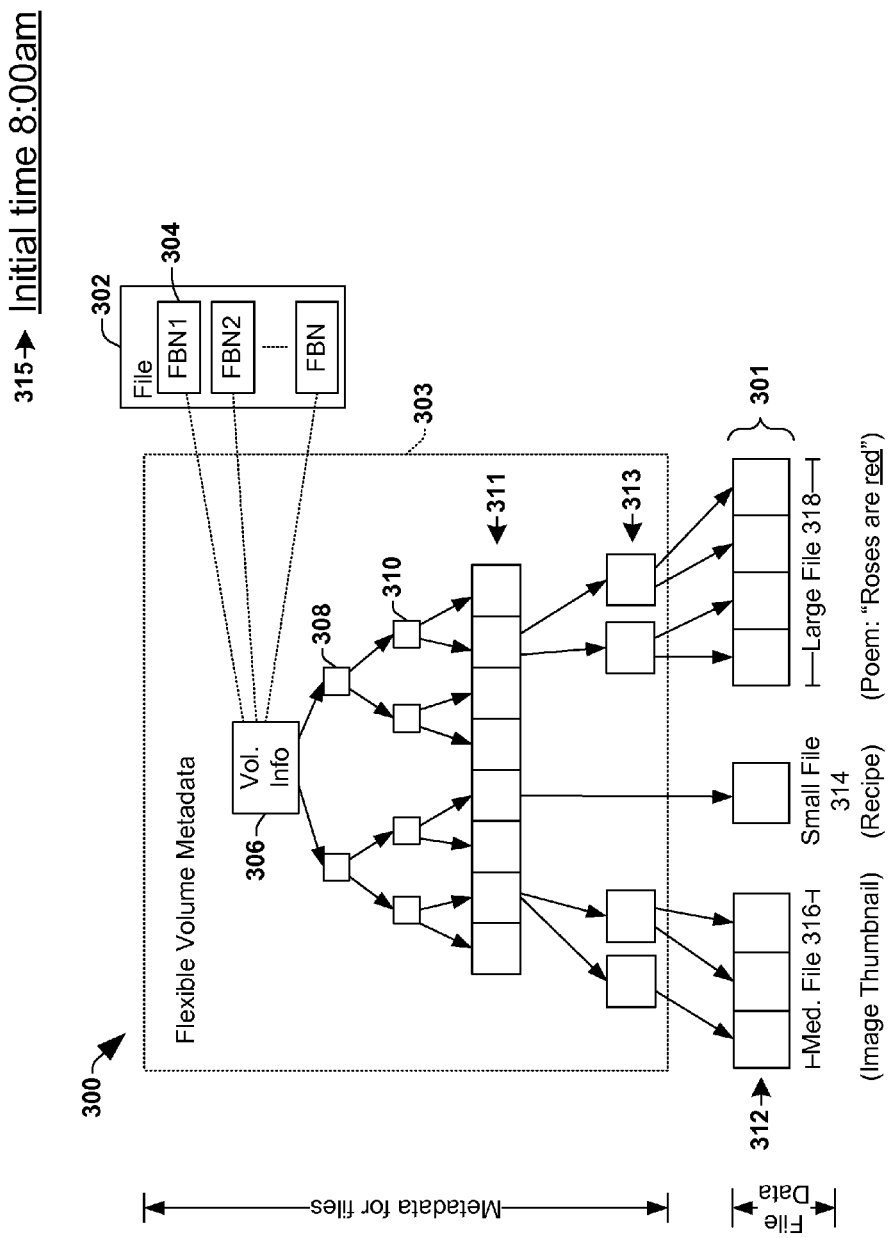
FIG. 3 illustrates an example of how data files can be stored within a virtual volume at an initial time.

FIG. 3 illustrates an example of how data files can be stored within a virtual volume 301 (e.g., Virtual Volume 1 (120) in FIG. 1). In particular, an inode structure 300 is illustrated which can be utilized to organize one or more files 302 into memory locations or blocks 312 in a virtual volume 301. It will be appreciated that since data is stored within blocks 312 of the virtual volume, these blocks 312 are at times referred to as data blocks of the virtual volume 301. In the illustrated example, three different files of varying sizes (e.g., small (recipe) 314, medium (image thumbnail) 316, and large (poem) 318) are illustrated, as are corresponding memory locations or blocks 312 of the virtual volume 301 within which the files are stored. It will be appreciated, however, that the illustrated example is not "to scale", at least, in that a virtual volume 301 typically comprises many more blocks available for storage (e.g., a very small number of available blocks of the virtual volume 301 are illustrated). Moreover, while the blocks 312 are illustrated as being in rows, they are not limited to this arrangement, but can be in any suitable configuration (and typically are in a different configuration since they are scattered about/comprised of different portions of different physical storage devices, and are merely arranged logically, such as viewed here in a row, by virtualization techniques).

The inode structure 300 comprises metadata 303 of pointers, etc. (illustrated by arrows) that directly or indirectly point to memory locations or blocks 312 of the virtual volume 301 within which the data is actually stored. It will be appreciated that the metadata 303 thus does not actually comprise the data to be stored, but instead comprises ancillary information about the data that can be used in deciding how to store or allocate the data among the blocks 312 of the virtual volume 301. For example, metadata can comprise, among other things, information about the location, size, creation time, modification time, access time, ownership, and/or access attributes of the data. It is also to be appreciated that while data allocation and storage is illustrated herein through the implementation of inode structures, that such data storage could be accomplished through different implementations. That is, the use and discussion of inode structures herein is not meant to be interpreted in a limiting sense, but is merely used as an example of one technique suitable for facilitating data storage and/or allocation in accordance with the provisions set forth herein.

An operating system (not illustrated), such as may be resident on one or more of the nodes 102a and 102b of the example clustered network 100 of FIG. 1, for example, can walk through and/or otherwise use metadata 303 of inode structure 300 to map and/or otherwise place the data files 314, 316, 318 within appropriate/designated data blocks 312 of a virtual volume 301. Since data blocks 312 of a virtual volume 301 generally correspond to disparate memory locations "scattered" over non-contiguous regions of different physical storage devices (e.g., some available space from first disk 114a, some available space from second disk 114b, and/or some available space from third disk 114c in FIG. 1), a vol_info block 306 for the virtual volume is generally consulted in mapping the data files (e.g., 314, 316, 318) to the appropriate data blocks 312 within which the files (and more particularly bits thereof) are stored.

More particularly, a file 302 to be stored within a virtual volume can be parsed into a plurality of file blocks, where respective blocks of that file are assigned numbers (e.g., file block numbers (FBNs) 304), and an operating system can access a vol_info block 306 to find the logical addresses for those file block numbers FBNs 304. It will be appreciated that the logical addresses merely comprise abstract descriptions that are discernable or recognizable by the operating system and/or other higher level applications, and that ultimately provide an indication as to which bits are to be stored where. That is, the logical addresses provide, among other things, an indication of which data blocks 312 of the virtual volume 301 respective bits of the file 302 are to be stored within. It will be appreciated, however, that respective blocks 312 generally comprise an amount of physical memory sufficient to store many, many bits (e.g., not just one bit is stored in each memory block).

It will also be appreciated that determining the logical addresses for different file blocks of a file 302 is merely one of a number of de-abstraction actions that generally are matriculated through to cause the higher-level or abstract notion of a data file 302 to be stored in appropriate data blocks 312 of a virtual volume (e.g. as a string of 0s or 1s). Accordingly, as another action, the operating system and/or other high level application can translate a FBN 304 to one or more virtual volume block numbers (VVBN) 308 by using the file's 302 inode and buftree (not illustrated). Similarly, the operating system can then translate a VVBN 308 to one or more physical volume block numbers (PVBN) 310 using the inode and buftree (not illustrated). One or more other de-abstraction actions can also occur that make use of one or more other aspects 311, 313, etc. of the metadata 303, and that ultimately allow a data storage controller (not illustrated) to write the desired data (e.g., file 302) to the appropriate data blocks 312 of the virtual volume 301.

As mentioned above, virtual volumes can be somewhat flexible due to, among other things, the fact that flexible volumes can be comprised of disparate memory locations spread across different storage devices (e.g., some available space from first disk 114a, some available space from second disk 114b and/or some available space from third disk 114c in FIG. 1). To illustrate this point, a conceptual example is introduced here with regard to FIG. 3 and is also carried through to FIGS. 4-7. In this example, the virtual volume 301 of FIG. 3 can be thought of as being generated at a particular or initial time 315, namely 8:00 am on a given day. At this particular point in time, three files are comprised within the virtual volume 301, namely the small file 314 (e.g., comprising a recipe), the medium file 316 (e.g., comprising a thumbnail image) and the large file 318 (e.g., comprising a poem, "Roses are red . . . ").

In the illustrated example, the small file 314 is stored within a single data block, the medium file 316 is stored within three data blocks and the large file 318 is stored within four data blocks of the virtual volume 301. Again, however, it will be appreciated that respective data blocks 312 may store many, many bits of data. Since this is the "original" data in this example, this data may be referred to as the parent, while any subsequent copies of this data may be referred to as a child. Accordingly, at 8:00 am, these three files 314, 316, 318 exist within the virtual volume 301, and a user may access any one or more of the files via a client (e.g., 108 of FIG. 1) operatively coupled to a clustered computing network comprising the virtual volume 301.

Figure 4:
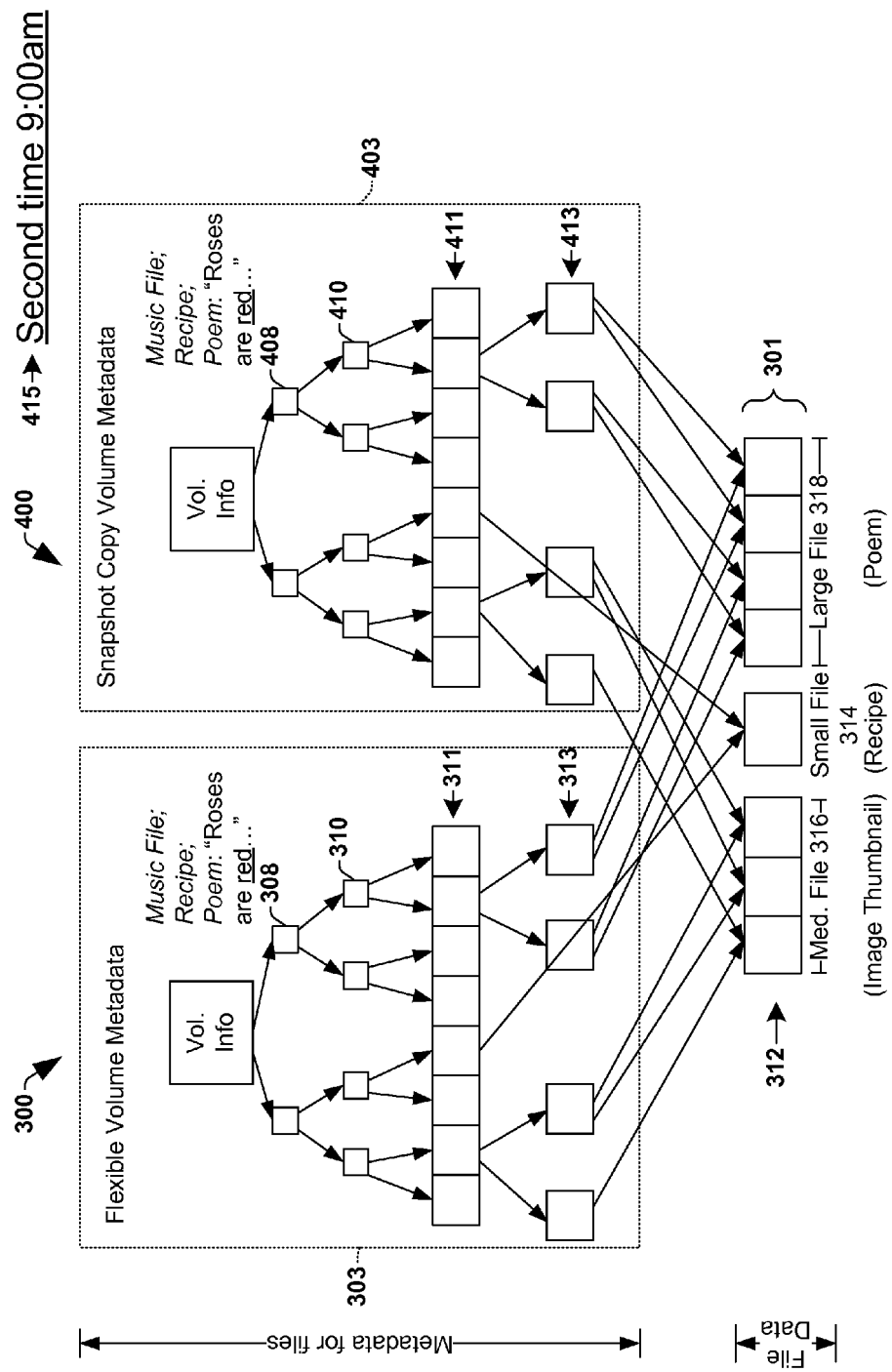
FIG. 4 illustrates an example of how data files can be stored within a virtual volume at a second time.

FIG. 4 illustrates an example of data stored within the virtual volume 301 at a second point in time 415 (9:00 am), which is after the data was initially created and stored (at 8:00 am). As can be seen, the original (parent) state of the data is preserved in that inode structure 300 is maintained. That is, the metadata 303 describing this (parent) data as it appeared in its 8:00 am state is maintained in inode structure 300. However, another inode structure 400 is created at this second point in time 415 (e.g., via user commands entered through an operating system running on a client (e.g., 108 of FIG. 1) operatively coupled to a clustered computing network comprising the virtual volume 301). This inode structure 400 comprises metadata 403 representing the data at this second point in time 415 (9:00 am). As with inode structure 300, the metadata 403 within the second inode structure 400 comprises several aspects 408, 410, 411, 413 that facilitate de-abstraction so that a data storage controller (not shown) may write data to the appropriate data blocks 312 of the virtual volume 301. This is also the case with other inode structures, and a similar discussion is therefore omitted when other inode structures are (subsequently) referenced herein.

In the illustrated example, the data has not changed from 8:00 am to 9:00 am. That is, the large poem file 318 still reads "Roses are red . . . ", and the other files 314, 316 likewise remain unchanged. Accordingly, the lowest aspects 413 of metadata 403 in the second inode structure 400 point to the same blocks 312 as the lowest aspects 313 of metadata 303. It can be appreciated that this allows two copies of the data (e.g., the parent and a child) to be stored in nearly the same amount of memory it would take to store one copy of the data. That is, since the metadata 303, 403 occupies on the order of 1% or less of the data which it represents, the two copies of the data can be stored very efficiently. Moreover, where there is overlap between sets of metadata (as in 303 and 403), those sets of metadata may be further compressed to make data storage even more efficient. It can be appreciated, that the 9:00 am snapshot copy volume of the original 8:00 am data can thus be generated simply by establishing metadata 403, rather than storing a whole other copy of the data in other data blocks 312 of the virtual volume 301. This is the case when multiple copies of the data are stored in a virtual volume.

Figure 5:
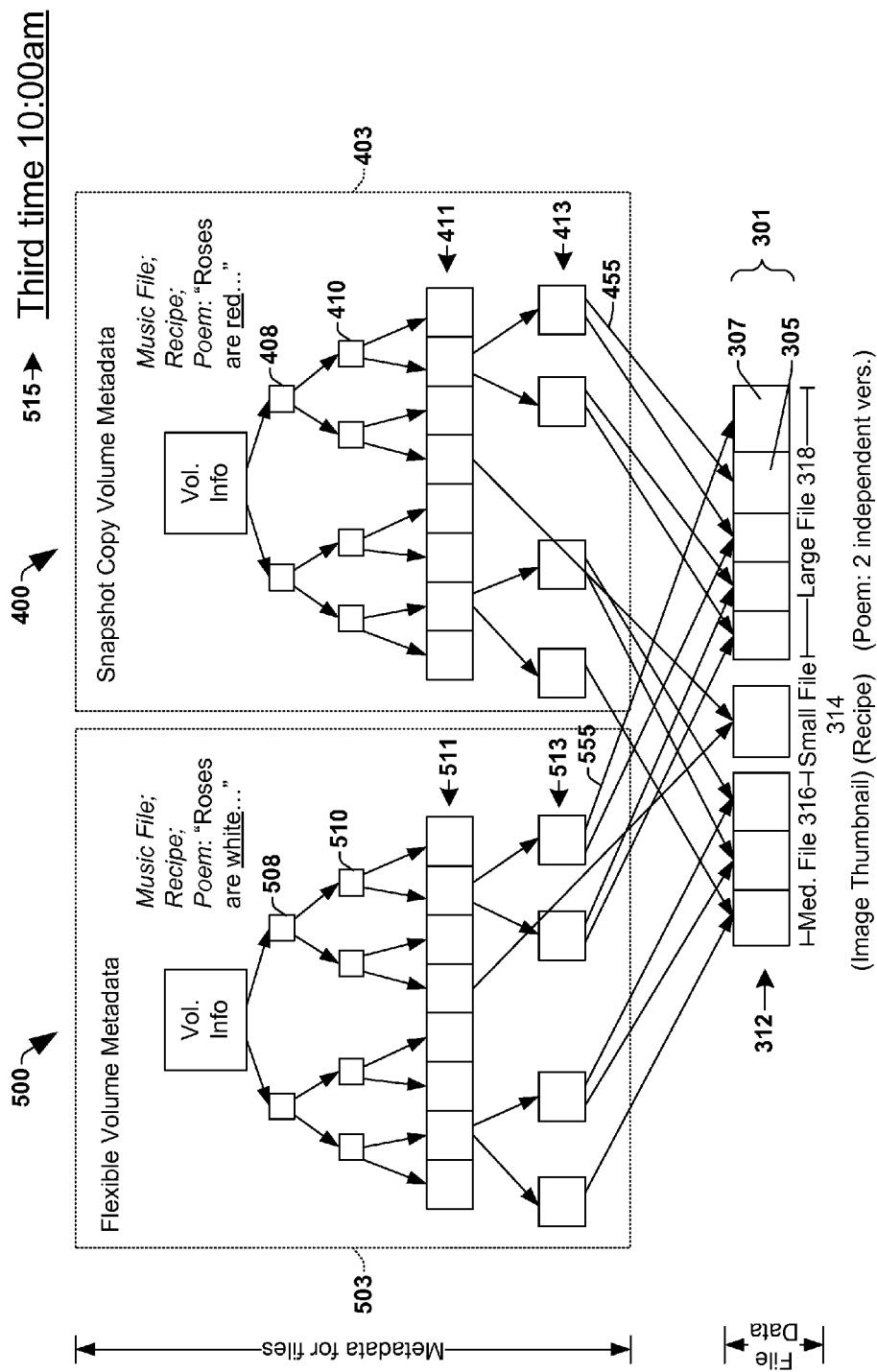
FIG. 5 illustrates an example of how data files can be stored within a virtual volume at a third time.

FIG. 5 illustrates data stored within the virtual volume 301 at a third point in time 515 (10:00 am). At this point in time, the snapshot copy volume remains unchanged, and the second inode structure 400 thus comprises the same metadata 403 as in FIG. 4 (at 9:00 am, which, in turn, was the same as the (parent) data at 8:00 am in the illustrated example). The files 314, 316, 318 identified by metadata 403 thus remain unchanged (e.g., "Roses are red . . . ") and are stored in the same data blocks 312 of virtual volume 301. At this third point in time 515 (10:00 am), however, a change is made to the original data such that the poem now reads "Roses are white . . . ". Accordingly, the original inode structure 300 is now referred to as a third inode structure 500. This third inode structure 500 is illustrated as comprising metadata 503 that points to many of the same, but also a different data block of the virtual volume 301. More particularly, pointer 555 of metadata 503 is illustrated as pointing to (previously un-pointed to) data block 307 of the virtual volume 301, whereas the corresponding pointer 455 of metadata 403 points to the same (fourth) data block 305 (as in FIGS. 3 and 4). For example the data block 305 may comprise the "red" in "Roses are red . . . ", whereas the data block 307 may comprise the "white" in "Roses are white . . . ".

It will be appreciated that while one (1) new data block 307 is illustrated in FIG. 5, that any number of new or different data blocks are contemplated, and that a single new data block is merely illustrated for simplicity and ease of understanding. Nevertheless, storing the data in this manner is efficient as merely the new or different data has to be allocated to another data block 312 of the virtual volume 301. That is, additional data blocks 312 of the virtual volume 301 do not have to be used to store redundant copies of data. Accordingly, in the illustrated example, two independent versions of the large poem data file 318 are stored in 5 data blocks, with overlapping data stored in the first four data blocks, and new or different data stored in the fifth data block 307. The small recipe data file 314 and the medium image thumbnail data file 316 are stored in the same single and three data blocks, respectively, of the virtual volume 301 since they haven't changed in the illustrated example.

The end result is that, at 10:00 am, the snapshot copy metadata 403 retains a "snapshot" of the original or virtual volume as of the time the snapshot was created (e.g., 9:00 am), where the snapshot copy happens to correspond to the data at 8:00 am in the illustrated example (e.g., the data did not change between 8:00 am and 9:00 am). Thus, a version of the data as it originally appeared (at 8:00 am) is available at 10:00 am, even though changes are made to the original data at 10:00 am. Thus, in addition to a recipe and a thumbnail of an image, a user also has two different versions of the "Roses are _____ . . . " poem to work from.

Figure 6:
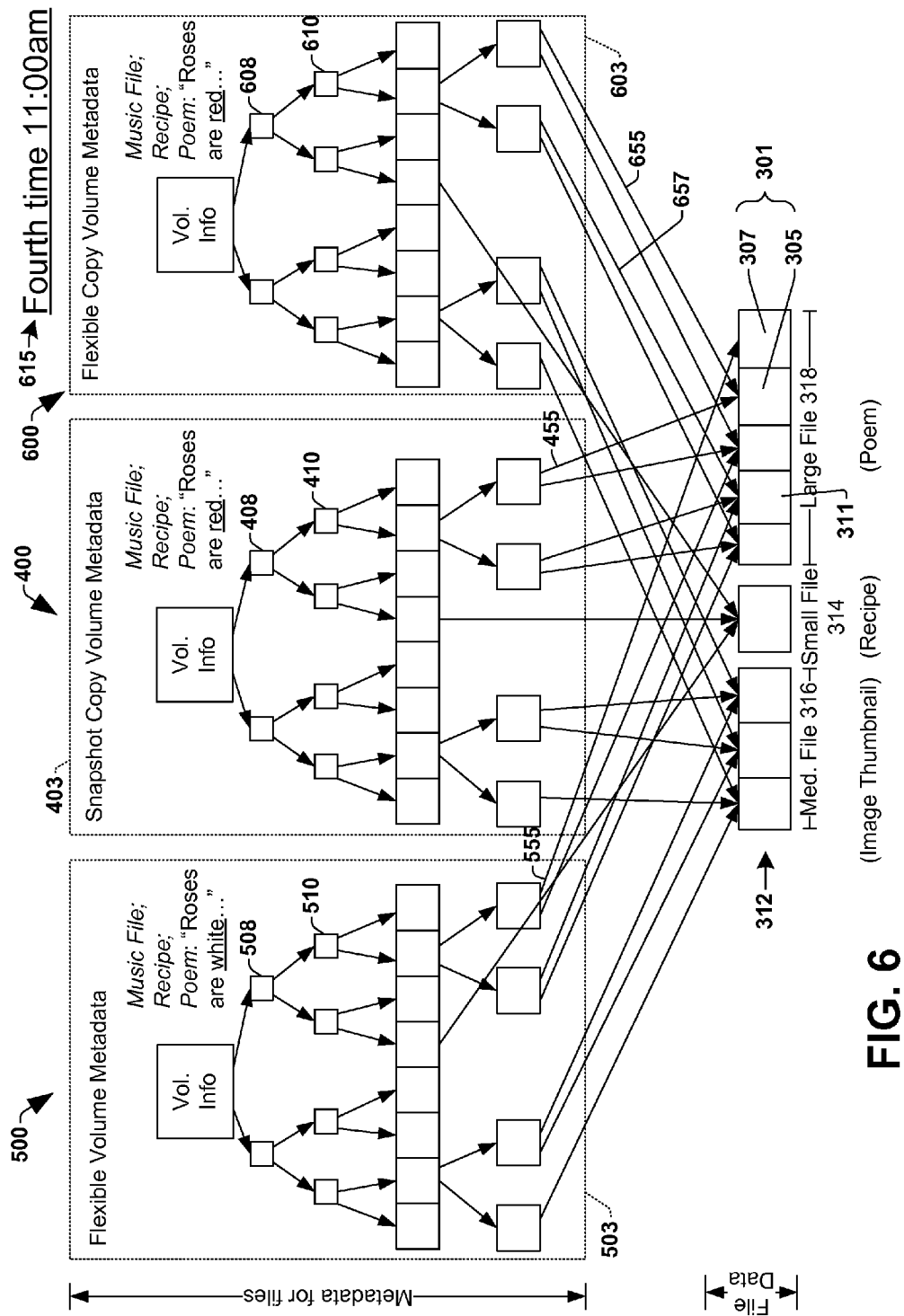
FIG. 6 illustrates an example of how data files can be stored within a virtual volume at a fourth time.

FIG. 6 illustrates data stored within the virtual volume 301 at a fourth point in time 615 (11:00 am). At this point in time, the virtual volume and the snapshot copy volume remain unchanged from the prior point in time (e.g., 10:00 am, FIG. 5). Accordingly, the third 500 and second 400 inode structures thus comprise the same respective sets of metadata 503, 403 that point to the same data blocks 312 of the virtual volume 301 as in FIG. 5. At this third point in time 515 (10:00 am), however, a flexible copy volume is made of the snapshot copy volume (e.g., as a result of user input via an operating system running on a client device). Accordingly, a fourth inode structure 600 is formed that comprises metadata 603 mirroring the metadata 403 of the second inode structure 400. As such, pointer 655 of metadata 603 (like pointer 455 of metadata 403) thus points to data block 305 of the virtual volume 301 to reflect the "Roses are red . . . " version of the large poem data file 318. The recipe 314 and thumbnail image 316 data files remain the same across the three different versions at this time (11:00 am), while the "Roses are white . . . " version of the large poem data file 318 exists in the third inode structure 500 at this time by virtue of, among other things, pointer 555 pointing to data block 307 of the virtual volume 301. Three copies of the data are thus efficiently stored in just a few data blocks 312 of the virtual volume 301. It will be appreciated that in some contexts, a flexible copy volume may be referred to as a flexible clone that makes use of technology available from the assignee of the instant application, for example. Additionally, although separate sets or instantiations of metadata 403, 503, 603 are illustrated, it is to be appreciated that often different sets of metadata comprise substantially the same metadata, as in the illustrated example, and thus are not completely separate instantiations. That is, they can be stored and expressed in a condensed manner.

Figure 7:
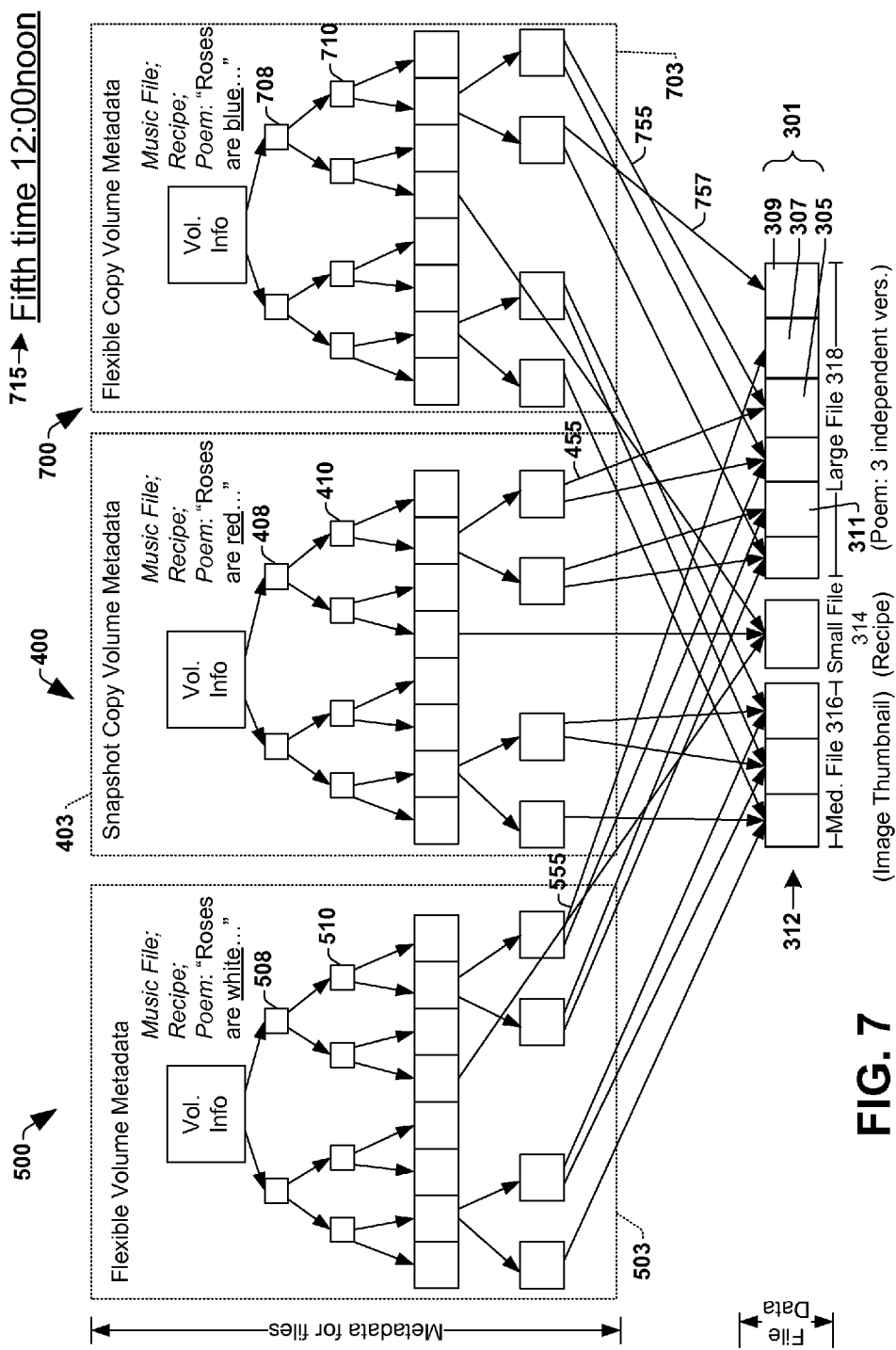
FIG. 7 illustrates an example of how data files can be stored within a virtual volume at a fifth time.

FIG. 7 illustrates data stored within the virtual volume 301 at a fifth point in time 715 (12:00 noon). At this point in time, the virtual volume and the snapshot copy volume remain unchanged from the prior point in time (e.g., 10:00 am, FIG. 5). Accordingly, the third 500 and second 400 inode structures thus comprise the same respective sets of metadata 503, 403 that point to the same data blocks 312 of the virtual volume 301 as in FIG. 6. At this third point in time 715 (12:00 noon), however, the data has been manipulated (e.g., as a result of user input via an operating system running on a client device) such that the large poem file 318 in the flexible copy volume reads "Roses are blue . . . ". Accordingly, the inode structure for the flexible copy volume is now referred to as a fifth inode structure 700. Since the medium image thumbnail file 316 and the small recipe file 314 have not changed, and just some of the large poem file 318 has changed, much of the metadata 703 in this fifth inode structure 700 is the same as the metadata 603 in the fourth inode data structure 600 (FIG. 6). However, pointer 757 of fifth inode structure 700 now points to a sixth data block 309 of the set of data blocks used to store the large poem file 318 (to reflect this change to "Roses are blue . . . "), whereas in FIG. 6 that same pointer 657 formerly pointed to the second data block 311 of the set of data blocks used to store the large poem file 318 (to store the "Roses are red . . . " version of the poem). Thus, at this point in time, in addition to a recipe and a thumbnail of an image, a user also has three different versions of the "Roses are . . . " poem to work from, where the "Roses are red . . . " version was created at 9:00 am (FIG. 4) (and actually reflects the state of the data at 8:00 am since the data was not changed between 8:00 am and 9:00 am), the "Roses are white . . . " version was created at 10:00 am (FIG. 5) and the "Roses are blue . . . " version was created at noon (FIG. 7).

It can be appreciated that storing data in this manner allows the data to be selectively altered for testing and/or other purposes (e.g., recipe 314 and image thumbnail 316 files can remain the same while some portion of the poem file 318 can be altered in different manners at the same and/or different points in time). Moreover, this also allows various versions of the data to be stored efficiently. For example, in the preceding scenario eleven (11) different copies of each of the recipe 314, image thumbnail 316 and poem 318 data files data were effectively stored in 10 different data blocks 312 of the virtual volume 301 (e.g., 1 copy at 8:00 am (FIG. 3), 2 copies at 9:00 am (FIG. 4), 2 copies at 10:00 am (FIG. 5), 3 copies at 11:00 am (FIG. 6) and 3 copies at noon (FIG. 7)).

Nevertheless, even though some data blocks 312 of the virtual volume 301 are shared or reused when storing the different copies of these data files, it can be appreciated that the number of data blocks needed to store copies of these files can increase dramatically as changes are made to the data over time (e.g., and there is less and less overlap between the files). By way of example, snapshot copies of the data files could be taken at regular intervals (e.g., every hour), as a function of some system functionality (e.g., at bootup), or at any other suitable times, and flexible copy volumes could be developed from any one or more of these snapshot copies. In the previous scenario, for example, a single snapshot 400 is taken at 9:00 am (FIG. 4), and a flexible copy 600 of that snapshot 400 is created at 11:00 am (FIG. 6). However, one or more snapshots of all the different copies could be taken at any (interval of) time (e.g., one or more respective snapshots of the 2 copies at 9:00 am (FIG. 4), one or more respective snapshots of the 2 copies at 10:00 am (FIG. 5), one or more respective snapshots of the 3 copies at 11:00 am (FIG. 6) and/or one or more respective snapshots of the 3 copies at noon), and flexible copies of these snapshots could likewise be created from any one or more of these snapshots. It can be appreciated that this could lead to a significant increase in the amount of data to be stored, particularly where the data changes over time, which is typically the case as the data evolves, such as during development and/or testing or a large computer program, for example.

With regard to terminology, although storing the different states of the different data files 314, 316, 318, at different points in time, has been described with regard to inode structures and the metadata stored therein, at the different points in time, it will be appreciated that the inode structures, the corresponding metadata and the data files stored thereby may, at times, be referred to as volumes or the like. For example, the fifth inode structure 700, the metadata 703 comprised therein and the state of the data files 314, 316, 318 stored thereby in particular data blocks 312 of the virtual volume 301 may be referred to as a flexible copy volume, or simply a flexible or flex. copy. Similarly, the second inode structure 400, the metadata 403 comprised therein and the state of the data files 314, 316, 318 stored thereby in particular data blocks 312 of the virtual volume 301 may be referred to as a snapshot copy volume, or simply a snapshot copy. Likewise, the first inode structure 300, the metadata 303 comprised therein and the state of the data files 314, 316, 318 stored thereby in particular data blocks 312 of the virtual volume 301 may be referred to as a flexible volume, or simply a flex vol. Thus a virtual volume can contain one or more flexible volumes, one or more snapshot copy volumes and/or one or more flexible copy volumes. For example, the flexible volume 214, snapshot copy volume 216, first flexible copy volume 218 and/or second flexible copy volume 220 of FIG. 2 may be stored within a virtual volume.

It can be appreciated that creating multiple flexible copy volumes such that they comprise data with the same ownership and permissions (e.g., can be operated on by the same set of operations) may encourage a user to maintain more flexible copy volumes (e.g., to determine some trend in the data over time). However, because each flexible copy volume requires some resources, such as data blocks 312 of a virtual volume 301 (e.g., some amount of physical memory), for example, and the amount of resources required may increase over time as the data diverges, it can be appreciated that it would be desirable to allow different flexible copy volumes to be operated on by different rules so that fewer flexible copy volumes need to be maintained (e.g., a trend is discerned more quickly, they become irrelevant sooner, they are consulted less and less frequently, etc.). Moreover, it would also be desirable to automatically selectively delete flexibly copy volumes based upon some criteria (e.g., an earlier version of the poem "Roses are red . . . " is no longer being used). Such auto-deletion would reduce the number of flexible copy volumes maintained, thereby potentially freeing up memory in the system for other purposes.

Figure 8:
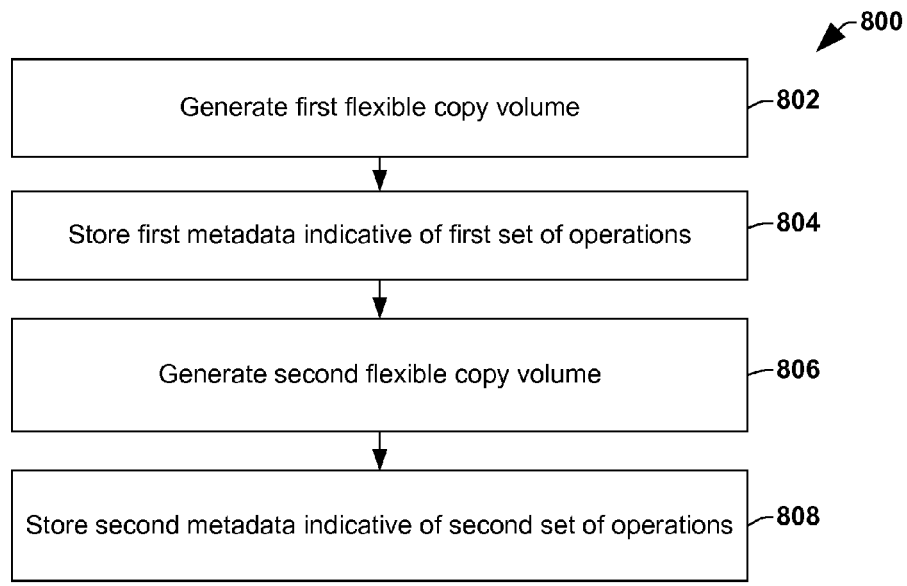
FIGS. 8 and 9 are flow diagrams illustrating one or more methods in accordance with one or more of the provisions set forth herein.
Figure 9:
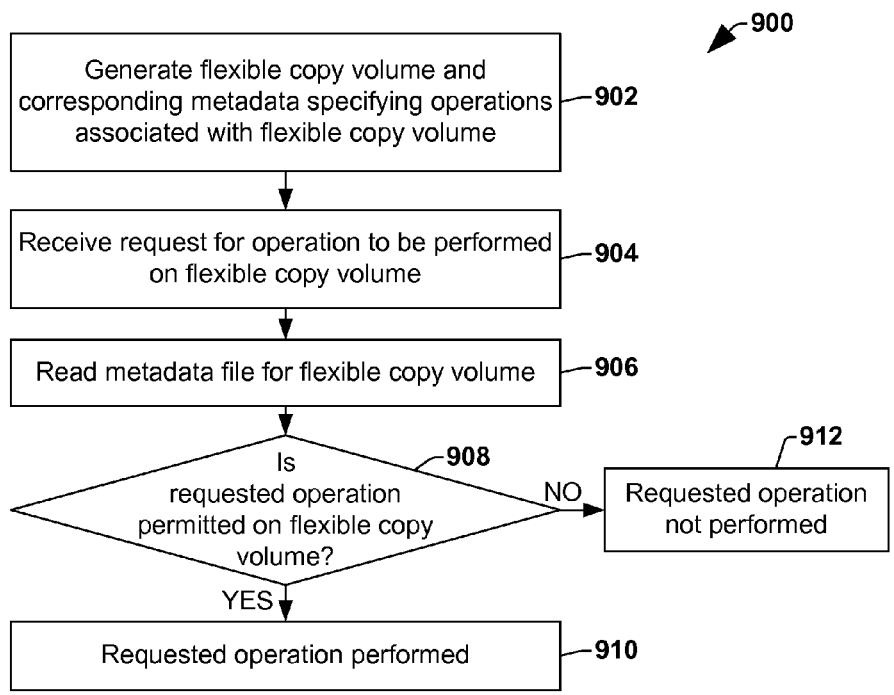

Turning to FIGS. 8 and 9, one or more methods are illustrated for handling different flexible copy volumes having different respective sets of operations as provided herein. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts may be required. Further, one or more of the acts depicted herein may be carried out in one or more separate acts or phases.

In FIG. 8, example method 800 starts at 802 when a first flexible copy volume of a parent volume is generated. The first flexible copy volume may be based upon a snapshot copy volume and/or another (preexisting) flexible copy volume, for example, where the parent volume comprises the state of data stored therein at a particular point in time.

At 804, first metadata for the first flexible copy volume is stored such that the first flexible copy volume can be operated on by a first set of operations. That is, first metadata is generated to comprise the first set of operations which can be applied to the first flexible copy. In one example, this may occur substantially concurrently with the creation of other metadata associated with the first flexible copy. For example, if an inode structure is implemented (e.g., as described above with regard to FIGS. 3-7), and thus there is other metadata that, among other things, indicates which blocks of a virtual volume data of the first flexible copy volume is to be stored within, then the first metadata can be created at about the same time as and stored with this other metadata. For example, the first metadata can be part of the metadata data structure that also comprises this other metadata. It will be appreciated that this may also be true if data structures other than inode data structures are implemented. Alternatively, the first metadata may be created and stored at a time different than when other metadata of the first flexible copy volume is created and stored. Also, the first metadata may be stored in a different data structure than other metadata of the first flexible copy volume, such as in a root directory and/or in any other suitable location. An operating system (e.g., or application utilizing the operating system), for example, can read the first metadata to determine the first set of operations (which can be applied to the first flexible copy volume), such as when initially accessing the first flexibly copy volume, for example.

At 806, a second flexible copy volume of the parent volume is generated. As with the first flexible copy volume, this second flexible copy volume may be based upon a snapshot copy volume and/or another (preexisting) flexible copy volume, for example, where the parent volume comprises the state of data stored therein at a particular point in time.

At 808, second metadata for the second flexible copy volume is stored such that the second flexible copy volume can be operated on by a second set of operations. That is, second metadata is generated to comprise the second set of operations which can be applied to the second flexible copy. In one example, this may occur substantially concurrently with the creation of other metadata associated with the first flexible copy. For example, if an inode structure is implemented (e.g., as described above with regard to FIGS. 3-7), and thus there is other metadata that, among other things, indicates which blocks of a virtual volume data of the second flexible copy volume is to be stored within, then the second metadata can be created at about the same time as and stored with this other metadata. For example, the second metadata can be part of the metadata data structure that also comprises this other metadata. It will be appreciated that this may also be true if data structures other than inode data structures are implemented. Alternatively, the second metadata may be created and stored at a time different than when other metadata of the second flexible copy volume is created and stored. Also, the second metadata may be stored in a different data structure than other metadata of the second flexible copy volume, such as in a root directory and/or in any other suitable location. An operating system, for example, can read the second metadata to determine the second set of operations (which can be applied to the second flexible copy volume), such as when initially accessing the second flexibly copy volume, for example.

FIG. 9 illustrates an example method 900 that starts at 902 when a flexible copy volume of a parent volume (e.g., snapshot copy volume and/or another (preexisting) flexible copy volume) is generated along with metadata that specifies a set of operations associated with (e.g., that can be performed upon) the flexible copy. In some embodiments, the flexible copy volume can be created when an administrator types a specific command onto a command line interface (CLI). Moreover, an administrator, for example, could create a restricted flexible copy volume or an unrestricted flexible copy volume by providing an appropriate indication when creating the flexible copy volume.

At 904, a request is received for an operation to be performed on the flexible copy of the virtual volume, such as from a user and/or an automated source, for example. Accordingly, at 906, the metadata of the flexible copy volume is read in response to the request. It will be appreciated that since the metadata associated with the flexible copy volume may pertain to more than just the operations that can be performed on the flexible copy volume, not all of the metadata associated with the flexible copy volume may be read. Rather, merely those portions of the metadata that pertain to the operations that are allowed to be performed on the flexible copy volume may be read. Then, at 908, a determination (e.g., by an operating system, application programming interface (API), and/or an application residing on a node and/or client) is made as to whether the requested operation is allowed on the flexible copy volume (e.g., by comparing the requested operation to the metadata enumerating the operations that are permitted to be performed on the flexible copy volume).

If the requested operation is allowed ("YES" at 908), the operation is performed on the flexible copy volume at 910. For example, if the flexible copy volume is designated as an unrestricted flexible copy volume to which data modifications are allowed and the requested operation is to modify a data block in the unrestricted flexible copy volume, the modifications will be allowed at this point. If, however, the requested operation is not allowed ("NO" at 908), the operation is disallowed at 912. For example, if the flexible copy volume is designated as a restricted flexible copy volume to which data modifications are not allowed and the requested operation is to modify a data block in the restricted flexible copy volume, the modifications will not be allowed at this point. Similarly, if the restricted flexible copy volume is used to verify data in a snapshot copy volume and the requested operation is something other than snapshot verification, then the operation will not be performed. If, on the other hand, the requested operation is snapshot verification, the operation will be allowed, and the flexible copy volume can be deleted (e.g., manually and/or automatically) once the verification is complete, for example, to conserve resources.

The following table includes an illustrative list of operations that may be disallowed on restricted flexible copy volumes and corresponding explanations as to why the respective operations are not allowed, in one example.

TABLE 1

| Operation | Explanation |
| --- | --- |
| Storage Creation | New LUNs cannot be created on a restricted flexible copy volume. |
| Snapshot Creation | New Snapshot copies cannot be created on a restricted flexible copy volume |
| Storage deletion | Only filesystems that use a restricted flexible copy volume are allowed to be deleted. The deletion of any other LUNs in the restricted flexible copy volume is disallowed. |
| Snapshot deletion | Deletion of snapshot copy volumes stored on a restricted flexible copy volume are disallowed. |
| Connecting to LUNs of a restricted flexible copy volume | Mapping the LUNs of a flexible copy volume to the nodes is disallowed |
| Disconnecting LUNs of a restricted flexible copy volume | Un-mapping the LUNs of the file system copy that created the flexible copy volume is not allowed |

Figure 10:
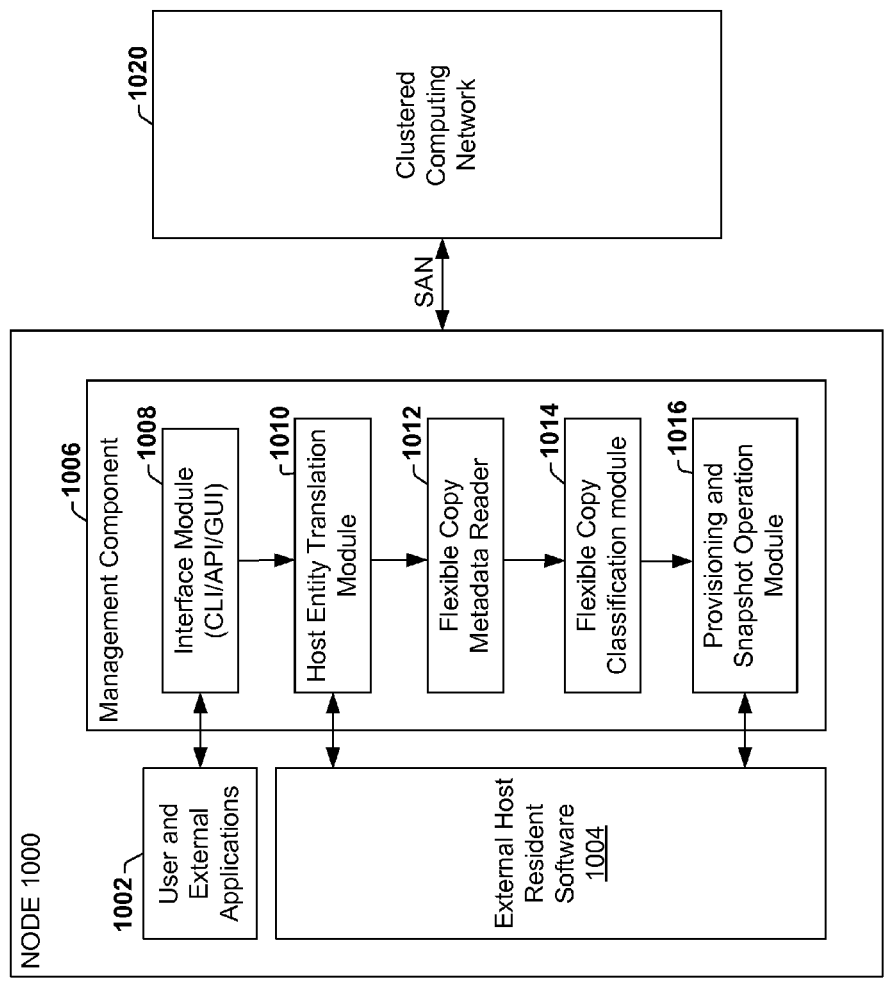
FIG. 10 illustrates an example host node configured to utilize flexible copy volumes that can be operated on by different sets of operations.

Illustrative list of operations disallowed for a restricted flexible copy volume Turning to FIG. 10, a block diagram of an example host node 1000 is illustrated where the node is configured to utilize different sets of operations to operate on flexible copy volumes in accordance with one or more of the provisions set forth herein. The node 1000 comprises a user and external applications component 1002, an external host resident software component 1004 (e.g., software and/or applications), and a management component 1006. The management component 1006 comprises an interface component 1008, a host entity translation component 1010, a metadata reader 1012, a classification component 1014, and/or a provisioning and snapshot operation component 1016. These components allow the host node 1000 to communicate with a clustered computing network 1020, for example, as illustrated and described with respect to FIG. 1, for example, through a storage area network (SAN) protocol.

The user and external applications component 1002 can be, for example, a server or application administrator or an external application that uses host management software. In some implementations the user and external application component 1002 can make use of drive technology available from the assignee of the instant application, for example. The external host resident software 1004 is executable on the external host node 1000 to facilitate the functionality available from the host node 1000.

The interface component 1008 allows the node 1000 to interact with users and external applications through a command line interface (CLI), application interface (API), and/or graphical user interface (GUI), for example.

The host entity translation component 1010 allows the node 1000 to determine underlying LUNs and/or data storage system resources for a given volume, file system, and/or disk group, for example.

The metadata reader component 1012 reads metadata from, for example, a root directory of a flexible copy volume, by interacting with the data storage system 1020.

The classification component 1014 detects the set of operations that can be performed on the flexible copy volume, for example, by interacting with the flexible copy volume metadata reader 1012. Depending upon the designation of the flexible copy volume (e.g., restricted or unrestricted) as determined by the classification component 1014, operations from the provisioning and snapshot operation component 1016, for example, may or may not be carried out on the flexible copy volume.

Figure 11:
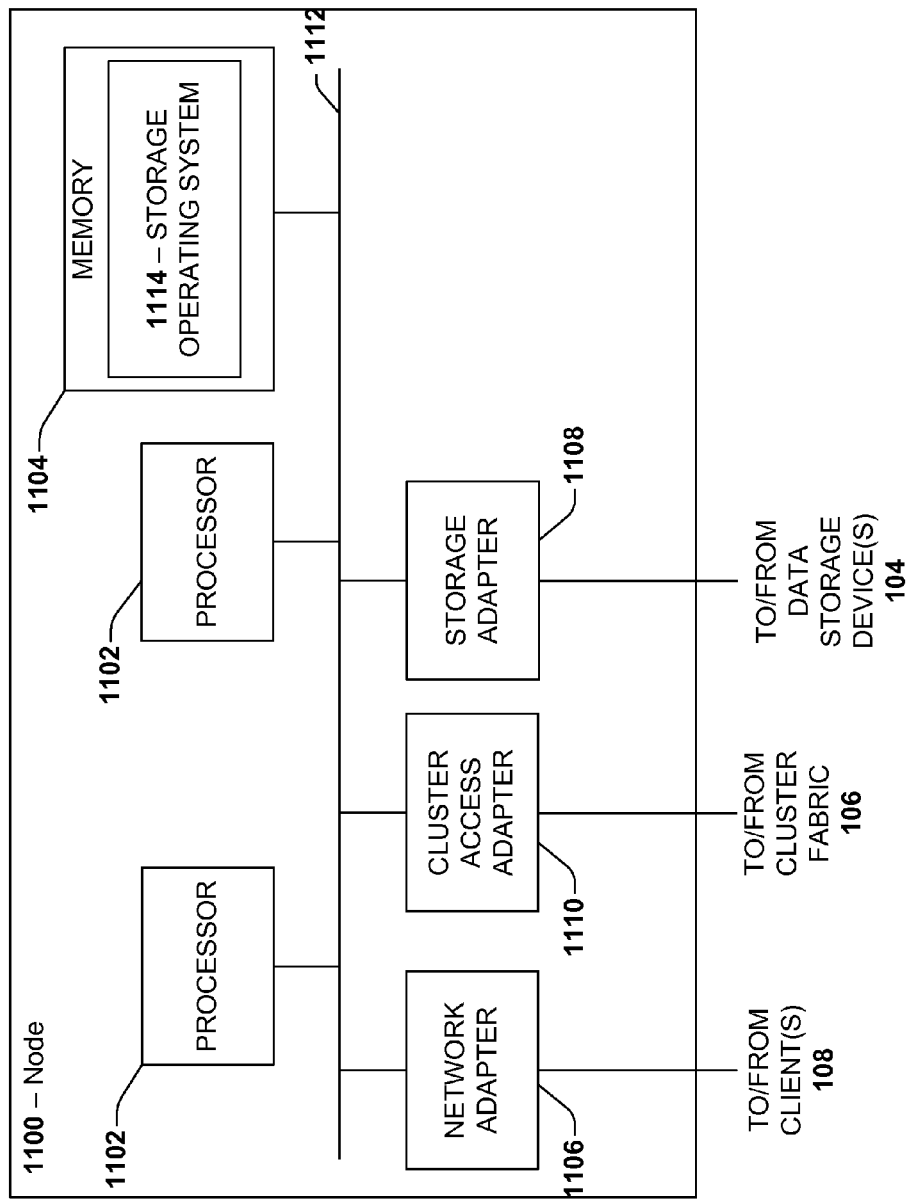
FIG. 11 illustrates an example host node in accordance with one or more aspects of this disclosure.

FIG. 11 is a block diagram of another embodiment of a node 1100 that may implement one or more of the techniques and/or systems described herein. The node 1100 includes one or more processors 1102, a memory 1104, a network adapter 1106, a storage adapter 1108, and a cluster access adapter 1110. The components are interconnected by a system bus 1112. The node 1100 also includes an operating system 1114 that can, for example, implement a data storage controller (e.g., RAID controller) to facilitate the use of different types of flexible copy volumes.

In the example node 1100, memory 1104 may include storage locations that are addressable by the processors 1102 and adapters for storing related software program code and data structures. The processors 1102 and adapters may, for example, include processing elements and/or logic circuitry configured to execute the software code and manipulate the data structures. The operating system 1114, portions of which are typically resident in memory 1104 and executed by the processing elements, functionally organizes the node 1100 by invoking storage operations in support of a file service implemented by the node. It will be apparent to those skilled in the art that other processing and memory means, including various computer readable media, may be used for storing and executing program instructions pertaining to the inventive techniques described herein.

The network adapter 1106 includes the mechanical, electrical and signaling circuitry needed to connect the node 1100 to a client (e.g., the client 108 in FIG. 1) over a computer network, which may comprise, among other things, a point-to-point connection or a shared medium, such as a local area network. The client may be a general-purpose computing device, such as a desktop computer, configured to execute applications. Similarly, the cluster access adapter allows the node to send and/or receive communications to/from a cluster fabric (e.g., 106 in FIG. 1).

The storage adapter 1108 cooperates with the storage operating system executing on the node to access information requested by the client. The information may be stored on any type of attached array of writeable media such as magnetic disk drives, flash memory, and other similar media adapted to store information (e.g., 104 in FIG. 1). The storage adapter 1108 includes input/output (I/O) interface circuitry that couples to the disks over an I/O interconnect arrangement, such as a conventional high-performance, Fibre Channel serial link topology, for example. The information is retrieved by the storage adapter 1108 and, if necessary, processed by the processors 1102 (or the adapter 1108 itself) prior to being forwarded over the system bus 1112 to the network adapter 1106, where the information is formatted into a packet and returned to the client.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a data storage system. Moreover, the teachings herein can be configured to a variety of data storage system architectures including, but not limited to, a network-attached storage environment and/or a storage area network and disk assembly directly attached to a client or host computer. Data storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 12:
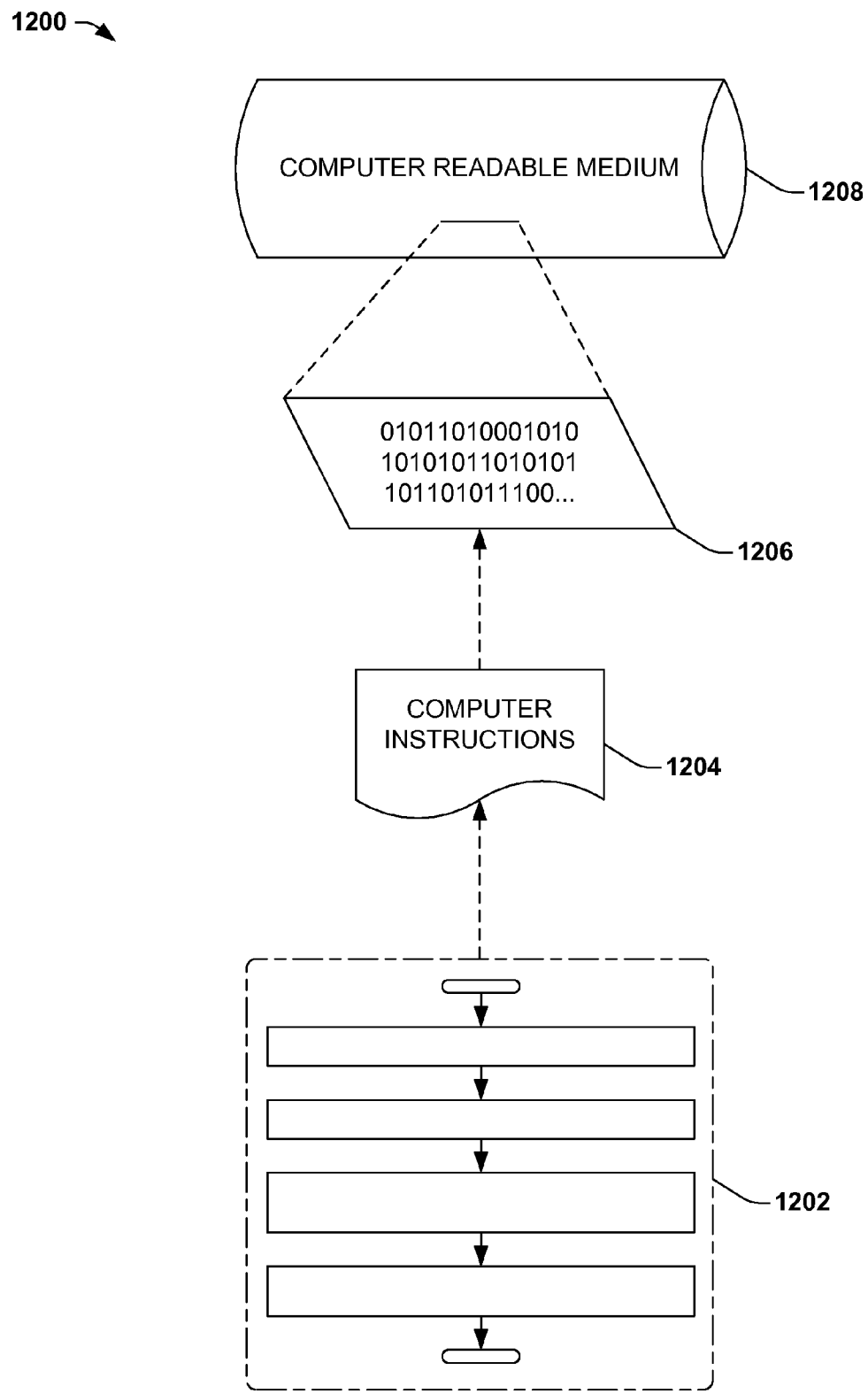
FIG. 12 is an example of a computer readable medium in accordance with one or more aspects of this disclosure.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 12, where the implementation 1200 comprises a computer-readable medium 1208 (e.g., a CD-R, DVD-R, or a platter of a hard disk drive), on which is encoded computer-readable data 1206. This computer-readable data 1206 in turn comprises a set of computer instructions 1204 configured to operate according to the principles set forth herein. In one such embodiment, the processor-executable instructions 1204 may be configured to perform a method 1202, such as the method 900 of FIG. 8 or method 950 of FIG. 9, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A computer implemented method for defining allowed operations for one or more flexible copy volumes associated with an original flexible volume, comprising:
    generating a first flexible copy volume associated with an original flexible volume;
    defining a first set of allowed operations for the first flexible copy volume within first metadata associated with the first flexible copy volume;
    generating a second flexible copy volume associated with the original flexible volume; and
    defining a second set of allowed operations for the second flexible copy volume within second metadata associated with the second flexible copy volume, the second set of allowed operations different than the first set of allowed operations, the first set of allowed operations comprising a first operation that is not comprised in the second set of allowed operations, the first flexible copy volume and the second flexible copy volume available for allowed operations regardless of a state of the original flexible volume.

2. The method of claim 1, the generating a first flexible copy volume comprising:
    generating the first flexible copy volume based upon a snapshot copy volume of the original flexible volume.

3. The method of claim 2, the generating a second flexible copy volume comprising:
    generating the second flexible copy volume based upon the snapshot copy volume of the original flexible volume.

4. The method of claim 1, the first set of allowed operations identifying a read operation, a write operation, and a delete operation as allowed for the first flexible copy volume.

5. The method of claim 4, the second set of allowed operations identifying at least one of the read operation or the delete operation as allowed for the second flexible copy volume.

6. The method of claim 5, the second set of allowed operations identifying the write operation as not allowed for the second flexible copy volume.

7. The method of claim 1, the second set of allowed operations identifying at least one of a create logical unit number (LUN) operation, a create snapshot copy volume operation, a provisioning operation, a backup operation, a restore operation, or a clone operation as not allowed for the second flexible copy volume.

8. The method of claim 1, the first metadata comprised in a first metadata file.

9. The method of claim 1, the second metadata comprised in a second metadata file.

10. The method of claim 1, the first flexible copy volume comprising an unrestricted flexible copy volume of the original flexible volume and the second flexible copy volume comprising a restricted flexible copy volume of the original flexible volume.

11. The method of claim 1, comprising at least one of:
    automatically deleting the first flexible copy volume based upon detecting completion of one or more allowed operations for the first flexible copy volume; or
    automatically deleting the second flexible copy volume based upon detecting completion of one or more allowed operations for the second flexible copy volume.

12. The method of claim 1, comprising:
    receiving a first request to perform an operation on the first flexible copy volume; and performing the operation on the first flexible copy volume based upon the first set of allowed operations comprising the operation.

13. The method of claim 12, comprising:
receiving a second request to perform the operation on the second flexible copy volume; and
refraining from performing the operation on the second flexible copy volume based upon the second set of allowed operations not comprising the operation.

14. A system for defining allowed operations for one or more flexible copy volumes associated with an original flexible volume, comprising:
a defining component configured to:
generate a first flexible copy volume associated with an original flexible volume;
define a first set of allowed operations for the first flexible copy volume within first metadata associated with the first flexible COPY volume;
generate a second flexible copy volume associated with the original flexible volume; and
define a second set of allowed operations for the second flexible copy volume within second metadata associated with the second flexible copy volume, the second set of allowed operations different than the first set of allowed operations, the first set of allowed operations comprising a first operation that is not comprised in the second set of allowed operations, the first flexible copy volume and the second flexible copy volume available for allowed operations regardless of a state of the original flexible volume.

15. The system of claim 14, comprising:
an access component configured to:
receive a first request to perform an operation on the first flexible copy volume; and
perform the operation on the first flexible copy volume based upon the first set of allowed operations comprising the operation.

16. The system of claim 15, the access component configured to:
receive a second request to perform the operation on the second flexible copy volume; and
refrain from performing the operation on the second flexible copy volume based upon the second set of allowed operations not comprising the operation.

17. The system of claim 15, the access component configured to:
automatically delete the first flexible copy volume based upon detecting completion of one or more allowed operations for the first flexible copy volume; and
automatically delete the second flexible copy volume based upon detecting completion of one or more allowed operations for the second flexible copy volume.

18. The system of claim 14, the first set of allowed operations identifying a write operation as allowed for the first flexible copy volume and the second set of allowed operations identifying the write operation as not allowed for the second flexible copy volume.

19. A computer implemented method for defining allowed operations for one or more flexible copy volumes associated with an original flexible volume, comprising:
defining, within first metadata associated with a first flexible copy volume associated with an original flexible volume, a first set of allowed operations for the first flexible copy volume; and
defining, within second metadata associated with a second flexible copy volume associated with the original flexible volume, a second set of allowed operations for the second flexible copy volume, the second set of allowed operations different than the first set of allowed operations, the first set of allowed operations comprising a first operation that is not comprised in the second set of allowed operations, the first flexible copy volume and the second flexible copy volume available for allowed operations regardless of a state of the original flexible volume.

20. The method of claim 19, comprising:
receiving a first request to perform an operation on the first flexible copy volume;
performing the operation on the first flexible copy volume based upon the first set of allowed operations comprising the operation;
receiving a second request to perform the operation on the second flexible copy volume; and
refraining from performing the operation on the second flexible copy volume based upon the second set of allowed operations not comprising the operation.

21. A computer implemented method for controlling access to one or more flexible copy volumes, comprising:
receiving a first request to perform an operation on a first flexible copy volume associated with an original flexible volume;
receiving a second request to perform the operation on a second flexible copy volume associated with the original flexible volume;
performing the operation on the first flexible copy volume based upon a first set of allowed operations defined within first metadata associated with the first flexible copy volume comprising the operation; and
refraining from performing the operation on the second flexible copy volume based upon a second set of allowed operations defined within second metadata associated with the second flexible copy volume not comprising the operation, the first flexible copy volume and the second flexible copy volume available for allowed operations regardless of a state of the original flexible volume.

22. The method of claim 21, comprising:
automatically deleting the first flexible copy volume based upon detecting completion of one or more allowed operations for the first flexible copy volume; and
automatically deleting the second flexible copy volume based upon detecting completion of one or more allowed operations for the second flexible copy volume.

23. A computer implemented method for accessing one or more flexible copy volumes, comprising:
sending a first request to perform an operation on a first flexible copy volume associated with an original flexible volume, the operation performed on the first flexible copy volume based upon a first set of allowed operations defined within first metadata associated with the first flexible copy volume comprising the operation; and
sending a second request to perform the operation on a second flexible copy volume associated with the original flexible volume, the operation not performed on the second flexible copy volume based upon a second set of allowed operations defined within second metadata associated with the second flexible copy volume not comprising the operation, the first flexible copy volume and the second flexible copy volume available for allowed operations regardless of a state of the original flexible volume.

24. The method of claim 23, the first flexible copy volume comprising an unrestricted flexible copy volume of the original flexible volume and the second flexible copy volume comprising a restricted flexible copy volume of the original flexible volume.

25. The method of claim 23, the operation corresponding to at least one of a create logical unit number (LUN) operation, a create snapshot copy volume operation, a provisioning operation, a backup operation, a restore operation, or a clone operation.

* * * * *